June 21, 1960

C. T. HAWKINS 2,941,415

MOTION TRANSMITTING APPARATUS

Filed Jan. 2, 1958

United States Patent Office 2,941,415
Patented June 21, 1960

2,941,415

MOTION TRANSMITTING APPARATUS

Charles T. Hawkins, Verona, Pa., assignor to Westinghouse Air Brake Company, Wilmerding, Pa., a corporation of Pennsylvania Filed Jan. 2, 1958, Ser. No. 706,750

1 Claim. (Cl. 74—409)

My invention relates to motion transmitting apparatus, and particularly to an anti-backlash device for removing backlash and lost motion between a driver, a gear train, and a driven element in servomechanisms.

In many present-day applications, highly accurate servomechanisms are required in which a smooth transmission of forces between adjacent elements is necessary for successful operation. In particular, when gear trains are used in servomechanisms, it is necessary to remove backlash and lost motion between their meshing gears.

In prior practice, gear backlash has been removed through the use of precision gears, anti-backlash gears in which a spring is built into the gears so that motion of one gear with respect to an adjacent gear loads the spring, or by relatively cumbersome balancing spring arrangements in which the gears are externally spring loaded. All of these expedients, when reduced to practice, are highly expensive. Accordingly, it is an object of my invention to provide a simple removable anti-backlash device which may be employed with inexpensive gear trains to accurately and smoothly transmit motion between their input and output shafts.

Also, it is an object of my invention to provide an adjustable anti-backlash device which is adaptable to a wide range of system applications.

Further, it is an object of my invention to provide a unitary anti-backlash device which may be readily incorporated in new system design, or added to an existing system where wear has introduced or increased backlash and lost motion.

Still another object of my invention is to provide an anti-backlash device that is inexpensive to manufacture and simple to assemble.

My invention, in accordance with one embodiment thereof, is adapted to be employed with a servomechanism of the type comprising a transducer, such as a potentiometer, which is driven through a reduction gear unit by a servomotor. In practice, I provide a flat helically wound spring connected at one end to the output shaft of the reduction gear unit and connected at the other end to the gear housing, with a suitable initial spring load to oppose the frictional resistance in the gear unit and servomotor. With the apparatus so arranged, a self-sustaining spring load is maintained at the output shaft to remove backlash and lost motion.

It is to be understood that my invention is applicable, in its broader aspects, to any apparatus having relatively rotating elements, where it is desirable to remove backlash and lost motion between the elements.

I shall first describe one embodiment of my invention, and shall then point out the novel features thereof in claim.

In describing my invention, reference will be made to the accompanying drawings, in which corresponding parts are identified by corresponding reference characters, and in which.

Figure 1:
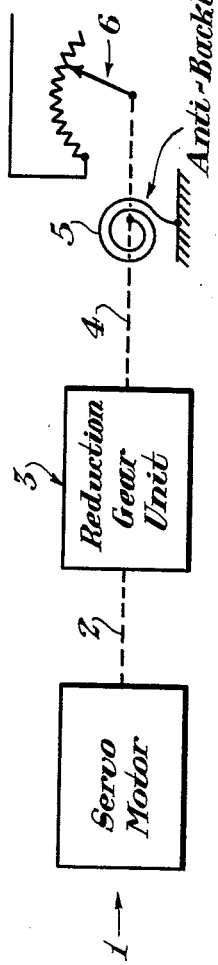
Fig. 1 is a schematic view of a servomechanism embodying my invention.

Referring now to Fig. 1, I have there shown a typical servomechanism comprising a servomotor 1, a reduction gear unit 3, and an output transducer 6, here shown as a potentiometer. Each of the three components may be of standard construction, and since their details do not form a part of my present invention, they are not shown. Servomotor 1 is connected to drive reduction gear unit 3 through a schematically indicated shaft 2. Reduction gear unit 3 has a schematically indicated output shaft 4 which is connected to move the wiper of potentiometer 6 with respect to its winding, as shown. Such servomechanisms are widely used for a variety of applications. For example, copending application for Letters Patent of the United States, Serial No. 512, 427, filed June 1, 1955, by James Colker, for Radar Simulation Systems, and assigned to the assignee of my present invention, shows a typical system employing servomechanisms of the type here considered. In the present application, servomotor 1, potentiometer 6, and reduction gear unit 3 correspond in function to constant speed motor 72, resolver 39, and reduction gear 86, respectively, in the copending application.

In operation, such servomechanisms are subject to backlash and lost motion which will prevent output shaft 4 from accurately following input shaft 2. Accordingly, I provide a helically wound spring 5 connected to shaft 4 at one end, and connected at the opposite end to a point fixed with respect to the housing of reduction gear unit 3. Spring 5 is initially loaded to oppose the frictional resistance of servomotor 1, and gear 3, and applies a gradually increasing force opposing the rotation of shaft 4 over its entire range of operation, which may comprise one or more revolutions, to remove backlash and lost motion between shaft 4 and input shaft 2.

Figure 2:
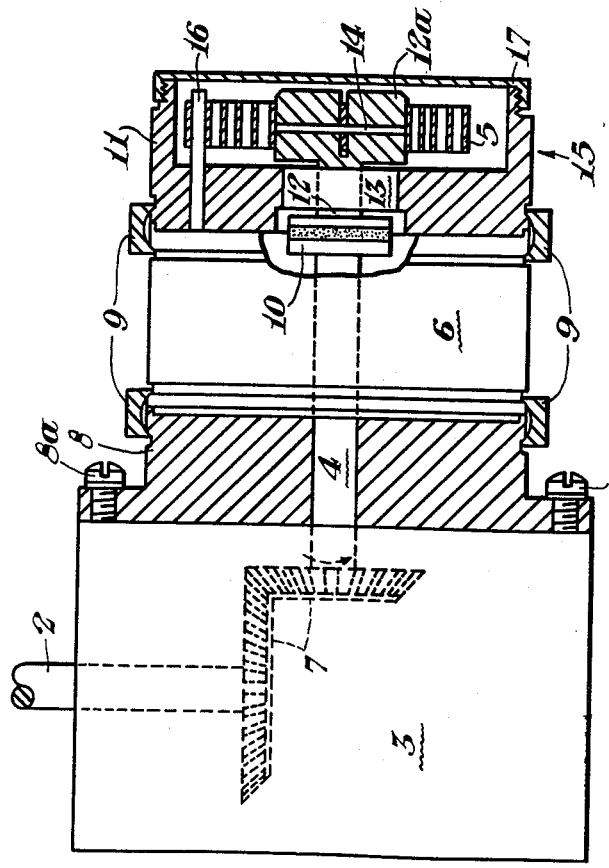
Fig. 2 is an elevational view, partially in section, of an anti-backlash device in accordance with a specific embodiment of my invention.

Fig. 2 shows a preferred embodiment of my invention, which is adapted to be employed in servomechanisms of the kind described in connection with Fig. 1. As shown, the housing of a conventional potentiometer 6 is mounted on output shaft 4 of a reduction gear unit 3 by means of an adapter 8. In practice, any number of potentiometers 6 may be serially mounted on output shaft 4 of reduction gear unit 3, and secured to the housing of gear unit 3 by conventional means, which are well known in the art. An antibacklash device 15, which will later be described, may similarly be mounted on output shaft 4 or connected thereto by a shaft extension, and secured to the housing of potentiometer 6 by the same conventional means, as will hereinafter be described. When so arranged, device 15 is adapted to generate a force which may be applied to output shaft 4 to remove blacklash and lost motion within gear unit 3.

As shown in Fig. 2, reduction gear unit 3 comprises meshing gears 7 connected to input shaft 2 and output shaft 4, to transmit motion applied to input shaft 2 to a potentiometer 6, or other transducer. An adapter 8, having a housing which is apertured to receive output shaft 4, is secured to the housing of reduction gear unit 3 by any suitable means, for example, by bolts 8a. The housing of potentiometer 6 is also apertured to receive output shaft 4. Potentiometer 6 is mounted on shaft 4 in a manner so well known in the art as not to require detailed description, so that the wiper of the potentiometer moves with respect to its winding in response to the motion of shaft 4, to transmit a signal to desired apparatus.

Figure 3:
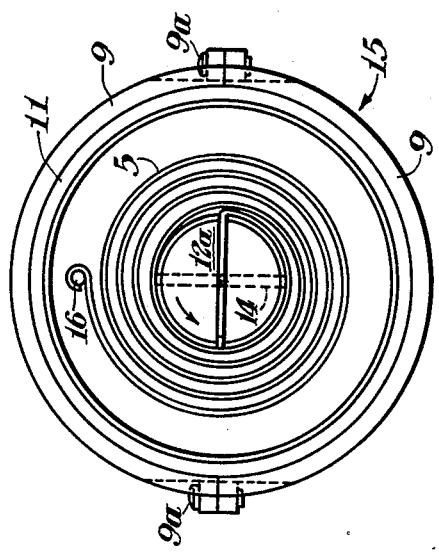
Fig. 3 is an end view of the device shown in Fig. 2 with the cover removed.

The housing of potentiometer 6 and its winding are mounted on shaft 4, and are secured to adapter 8, through a conventional retaining ring 9, having locking screws 9a, as best shown in Fig. 3.

Anti-backlash device 15 comprises a shaft 12 rotatable within a housing 11. A collar 12a is formed on one end of shaft 12, as shown in Fig. 2, and serves as a forming core for spring 5. Housing 11 is recessed at one end to receive a bearing 13 in which shaft 12 is rotatably mounted. At one end of shaft 12, one half of a suitable coupling 10, which may be of any conventional construction, is mounted and is received by a recess in housing 11. The back cover of potentiometer 6 is removed and a mating half of coupling 10 is similarly mounted on output shaft 4, and is received by a recess in the housing of potentiometer 6. The two coupling halves, when interconnected, permit shaft 12 to follow any motion of shaft 4. At the other end of shaft 12, and within an opening in housing 11, spring 5 is helically coiled about collar 12a and connected between the collar and housing 11, as will now be described.

As best shown in Fig. 3, collar 12a is slotted to receive a flat strip of suitable spring material which makes up formed spring 5. One end of the spring material is inserted within the slot in collar 12a and secured to the collar by a pin 14 which is received by aligned apertures in the collar and spring material. Spring 5 is then formed by coiling the spring material about collar 12a and securing its opposite end to a pin 16, which is secured to housing 11 by any suitable means. Spring 5 may be wound in either a clockwise or counterclockwise direction, depending on the direction in which it is desired to apply the spring load. For example, if output shaft 4 rotates continuously in a counterclockwise direction, as shown in Figs. 2 and 3, spring 5 should be coiled about collar 12a in a clockwise direction, as shown in Fig. 3, and loaded by rotating housing 11 clockwise with respect to output shaft 4, so that the applied spring load will oppose the direction of rotation of shaft 4. If shaft 4 oscillates, spring 5 may be wound in either direction, but must be wound sufficiently so that its applied spring load will oppose the maximum rotation of shaft 4 in either direction.

A cover plate 17 is removably secured to housing 11, as shown in Fig. 2, by any suitable means, for example, by mating threads formed on the housing and the cover plate.

In practice, device 15 is connected to the servo mechanism by coupling shaft 12 to output shaft 4 of reduction gear unit 3. Housing 11 is then rotated about shaft 12, oppositely of the desired rotation of output shaft 4, until the spring load of spring 5 is sufficient to overcome the frictional resistance of gear unit 3 and servomotor 1, as indicated by rotation of the servomotor. Housing 11 is then secured to the housing of potentiometer 6 by retaining ring 9 to maintain the initial spring load.

In operation, the initial tension of spring 5 holds shafts 12 and 4 against shaft 2, through meshing gears 7, so that when shaft 2 is rotated, shaft 4 will accurately follow its motion, due to the spring load between meshing gears 7.

Should the elements of the servomechanism, particularly gears 7, become worn through use, it is a relatively easy matter to increase the spring load. It is only necessary to loosen retaining ring 9, rotate housing 11 to introduce a spring load sufficient to take up the additional lost motion due to wear of gears 7, and then tighten ring 9 to secure housing 11 to the housing of potentiometer 6. The increased spring load will then be self-sustaining within the servomechanism to remove backlash and lost motion.

Although I have herein shown and described only one form of motion transmitting apparatus embodying my invention, it is to be understood that various changes and modifications may be made therein within the scope of the appended claim without departing from the spirit and scope of my invention.

Having thus described my invention, what I claim is:

A servomechanism comprising, in combination, a gear unit comprising a gear train interconnecting an input shaft and an output shaft, a potentiometer operatively associated with said output shaft for producing a signal proportional to the angle of rotation of said input shaft, means securing said potentiometer to said gear unit, a third shaft, means for operatively connecting said third shaft to said output shaft in any desired relative positions, a housing rotatably mounted on said third shaft in such manner that a portion of said third shaft projects into said housing, means for detachably securing said housing to said potentiometer in such manner that said housing may at times be detached from said potentiometer, rotated relative to said third shaft and reattached to said potentiometer in a new position, and a spring encased in said housing and having its one end secured to the projecting portion of said third shaft, said spring being helically wound about said third shaft and having its other end secured to said housing, whereby by detaching said housing from said potentiometer, rotating it, and reattaching it to said potentiometer the tension of said spring can be adjusted to any desired value to take up the backlash in said gear train.

References Cited in the file of this patent
UNITED STATES PATENTS

| | | |
|---|---|---|
| 1,977,289 | Scofield | Oct. 16, 1934 |
| 2,570,703 | Overacker | Oct. 9, 1951 |
| 2,698,509 | Valkenburgh et al. | Jan. 4, 1955 |
| 2,792,869 | Halvorsen | May 21, 1957 |